United States Patent [19]

Edwards

[11] 3,927,782
[45] Dec. 23, 1975

[54] PLASTIC CONTAINER AND BASE CONSTRUCTION

[75] Inventor: Bryant Edwards, Clarendon Hills, Ill.

[73] Assignee: Illinois Tool Works Inc., Chicago, Ill.

[22] Filed: July 2, 1974

[21] Appl. No.: 484,631

[52] U.S. Cl. ............. 215/100 R; 206/519; 215/1 C; 215/12 R; 248/350
[51] Int. Cl.² ........................................ B65D 23/00
[58] Field of Search .......... 215/1 C, 9, 12 R, 100 R; 220/69; 206/519, 520; 248/346, 346.1, 380

[56] References Cited
UNITED STATES PATENTS

| | | | |
|---|---|---|---|
| 648,436 | 5/1900 | Rider | 215/100 R |
| 2,710,109 | 6/1955 | Amann | 215/12 R |
| 2,963,256 | 12/1960 | Borah | 248/350 |
| 3,143,243 | 8/1964 | MacKusick | 248/350 |
| 3,403,714 | 10/1968 | Hulm | 215/12 R |
| 3,468,443 | 9/1969 | Marcus | 215/1 C |
| 3,482,724 | 12/1969 | Heaton | 215/100 R |
| 3,602,386 | 8/1971 | Brime | 220/17 |
| 3,722,725 | 3/1973 | Khetani | 215/1 C |

*Primary Examiner*—William Price
*Assistant Examiner*—Bruce H. Bernstein
*Attorney, Agent, or Firm*—E. L. Benno; R. W. Beart

[57] ABSTRACT

A base is arranged for assembly with a round bottomed container, the base comprising a central bottom panel, a connecting ring for coupling the base to a container, and an annular support channel joining the bottom panel to the ring. The annular support channel includes confronting channel walls and an intermediate foot, the inner channel wall having a lesser dimension axially of the base than the outer channel wall. The relative radial positioning and axial dimensioning of the channel walls causing the inner channel walls to deform a greater degree than the outer channel wall under axial loading whereby to insure stable, vertical placement of an assembled base and container.

7 Claims, 10 Drawing Figures

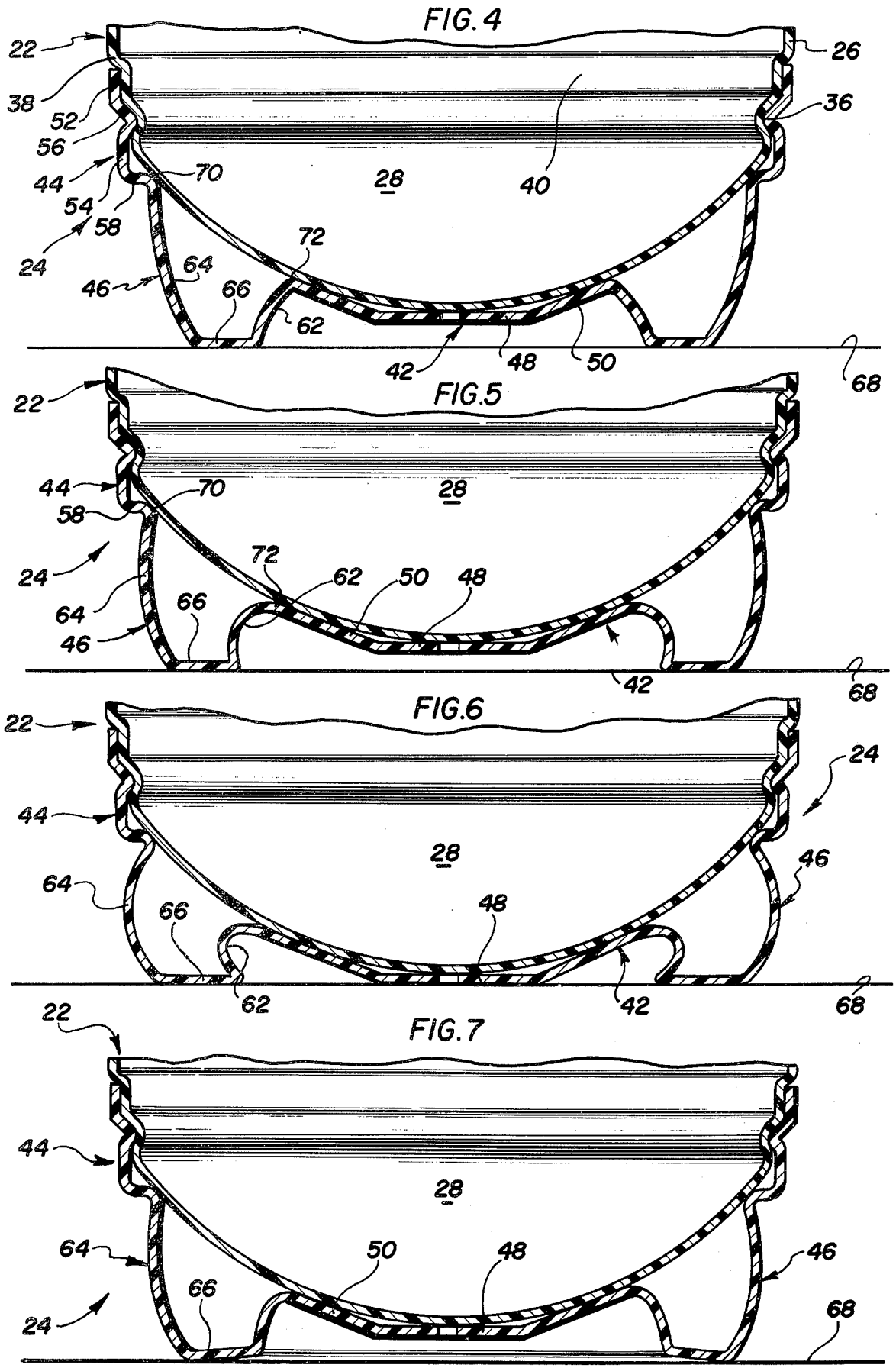

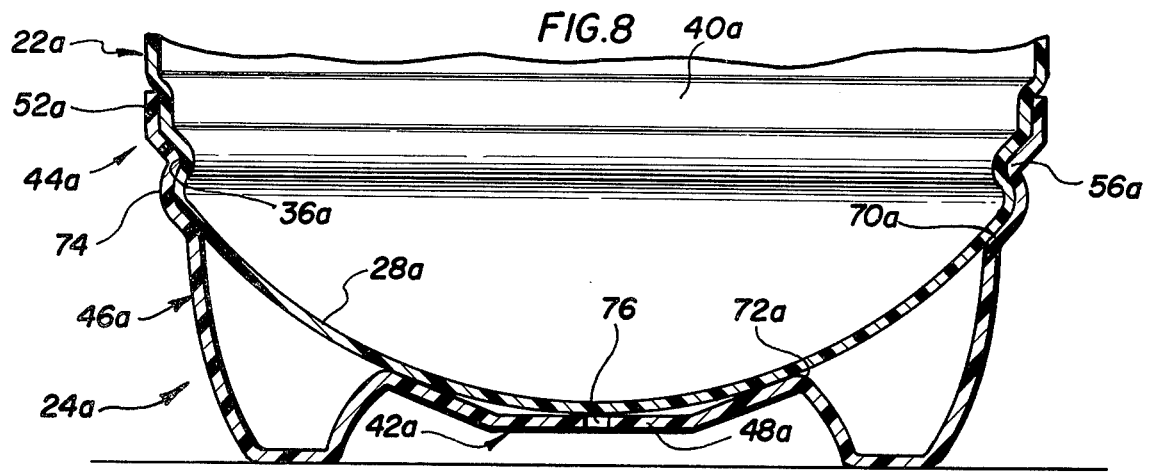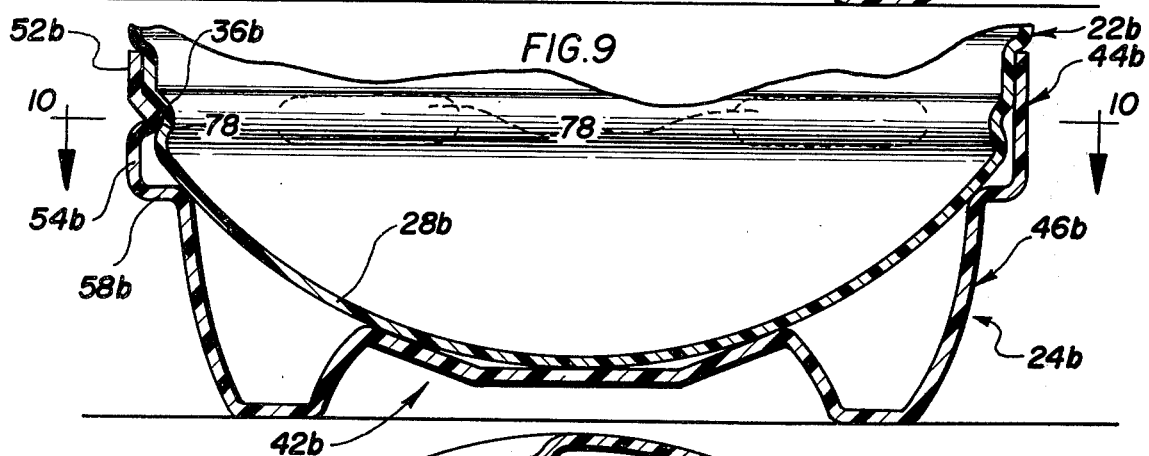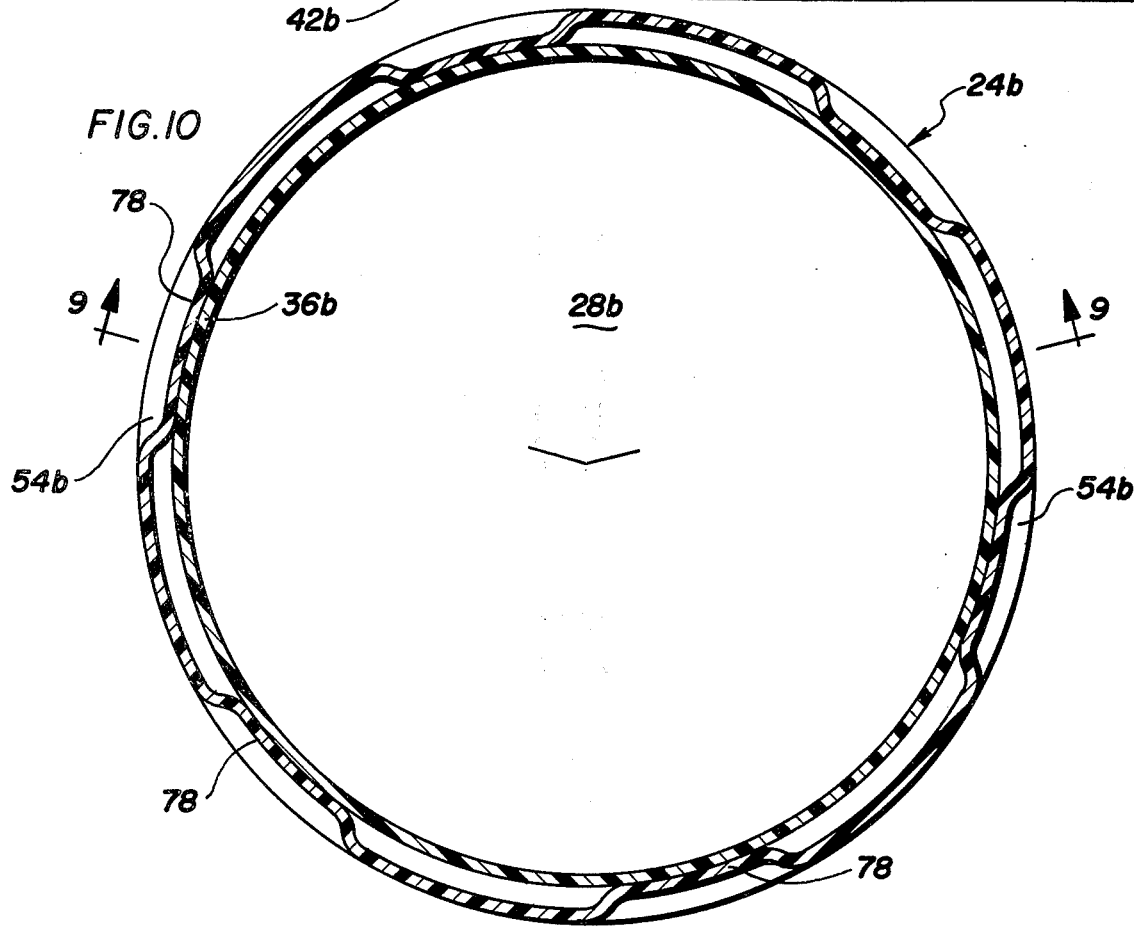

PLASTIC CONTAINER AND BASE CONSTRUCTION

BACKGROUND OF THE INVENTION

This invention relates generally to beverage containers and more particularly to containers for carbonated beverages and other pressurized products.

For many years, glass bottles were the standard package for such carbonated beverages as beer, colas and the like. Glass is desirably strong and inexpensive but metal containers have become popular because of their disposability and lightness in weight. More recent concerns over the potential which metal containers possess for environmental contamination have coupled with the rising cost of metal, particularly steel and the aluminum alloys that find their way into beverage containers, to turn attention and emphasis toward plastic bottles.

In order to fabricate plastic bottles at an acceptable cost, thin wall sections must be employed and these thin sections, in turn, require the bottle to have a generally convex shape, including a round or spherical bottom, for resisting the internal pressure of carbonated beverage contents. Of course, a spherical bottom end calls for a base of some sort to permit the bottle to stand free on a shelf or tabletop; however, the bases heretofore employed have been prone to tipping, especially after having been subjected to axial loading in stacks of filled bottles.

An important object of the present invention is, therefore, to provide a base for spherically bottomed plastic bottles which insures stable placement of the resultant assembly on any flat, generally horizontal surface.

Another object of the invention is to provide a plastic bottle base which insures stable placement despite permanent deformation under axial loading.

A more general object of the invention is to provide a new and improved plastic bottle and base assembly for containing products under pressure.

Yet another object of the invention is to provide a nestable base for round bottomed plastic bottles.

These and other objects and features of the invention will become more apparent from a consideration of the following descriptions.

BRIEF DESCRIPTION OF THE DRAWINGS

The invention, both as to its construction and its mode of operation, will be better understood by reference to the following disclosure and drawings forming a part therof, wherein:

FIG. 4 is an enlarged central sectional view in side elevation showing the container and base in assembled condition and illustrating the parts in a normal or axially unstressed condition;

FIG. 5 is a view similar to the showing of FIG. 4 but illustrating the base responding to axial loading;

FIG. 6 is a view similar to the showing of FIG. 5 but illustrating the response of the base to extreme axial loading;

FIG. 7 is a view similar to the showing of FIG. 5 but illustrating the base having taken a set after extreme or prolonged axial loading;

FIG. 8 is a central sectional view of a first modified form of the invention; and FIGS. 9 and 10 are sectional views, respectively in side elevation and top plan, of a further modified form of the invention.

DESCRIPTION OF THE DISCLOSED EMBODIMENTS

Figure 1:
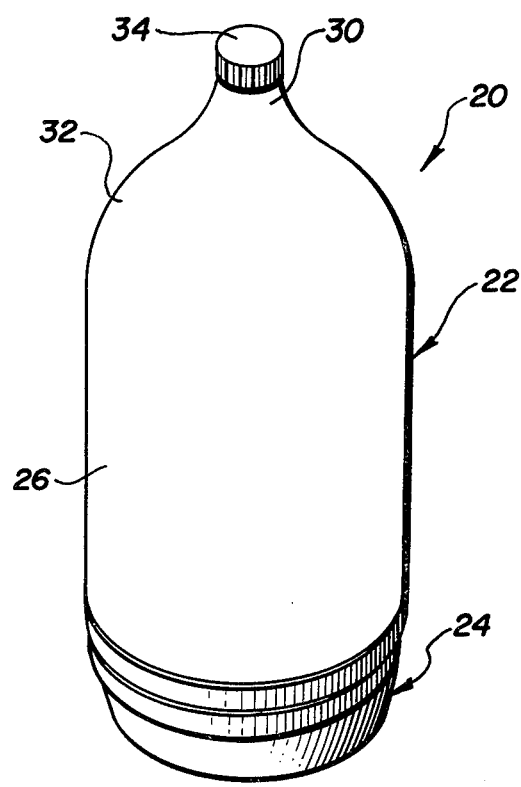
FIG. 1 is a perspective view of a round bottomed plastic container assembled to a base in compliance with the principles of the present invention.
Figure 2:
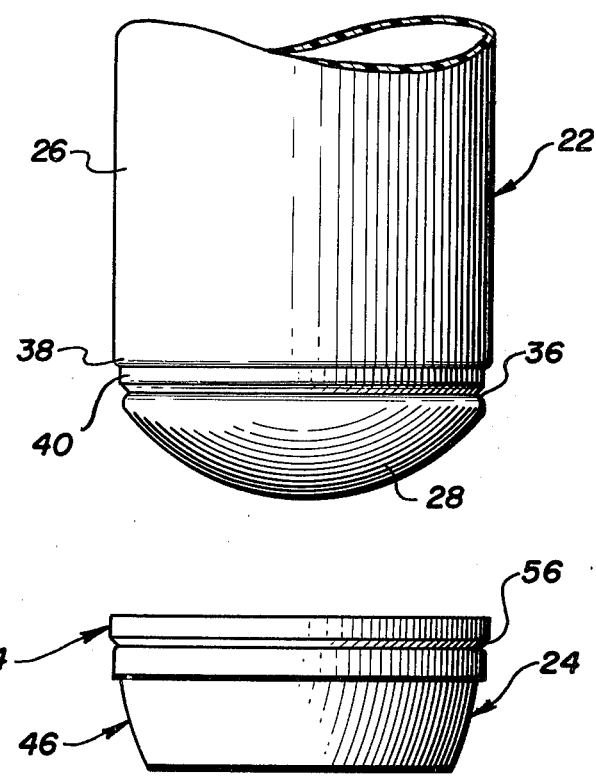
FIG. 2 is an exploded, side elevational view of the container and base of FIG. 1.

Referring now in detail to the drawings, particularly to FIGS. 1 and 2, a container assembly 20 for packaging fluid products under pressure comprises a bottle 22 and a base 24 for receiving and holding the bottle 22 in upright position. The bottle may be fabricated from a suitable resinous plastic material such as polyethylene and the base 24 is advantageously made from the same material or from another suitable material such as impact grade of styrene. The bottle 22 is fashioned with a cylindrical body 26 terminating at its lower extent in a rounded or generally spherical bottom 28, the upper end of the body 26 being joined to a tapered neck 30 by a rounded shoulder 32. In addition, the neck 30 is arranged to receive a threaded cap 34 or other conventional closure. At a location immediately overlying the round bottom 28, bottle 22 is provided with a continuous, annular groove 36; and the upper wall portion of groove 36 is connected to the cylindrical body 26 by an annular shoulder 38 and an annular wall 40 of smaller diameter than the body 26.

Turning to FIG. 4 for a description of the base 24, that part is seen to comprise a central bottom panel 42, a connecting ring 44 for coupling the base 24 to the bottle 22, and a generally U-shaped annular support channel 46 which joins the bottom panel 42 with the connecting ring 44. The bottom panel 42 includes a circular disc 48 and a frusto-conical panel 50 surrounding the disc whereas the connecting ring 44 is made up of upper and lower annular vertical walls 52 and 54, an intervening inwardly extending continuous coupling bead 56, and a horizontally extending wall 58. As will be seen clearly in the drawing, the coupling bead 56 of base 24 fits snugly into the groove 36 of bottle 22 in the assembled condition of these components, the annular wall 52 of the connecting ring 44 engaging the wall 40 beneath the shoulder 38 of bottle 22. A secure connection of the bottle and base results; and when even more positive attachment is desired, a suitable adhesive may be interposed between the bead 56 and the groove 36, or friction-welding of the parts may be utilized when they are fabricated from the same or compatible materials.

Figure 3:
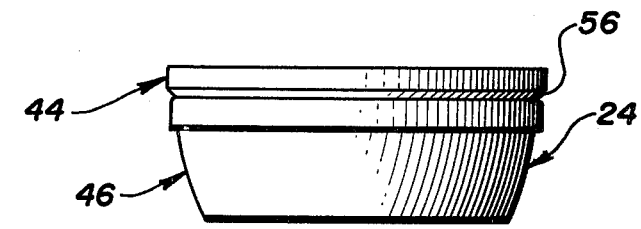
FIG. 3 is an enlarged, central sectional view in side elevation of two of the bases shown nested together for storage and shipment.
Figure 3:
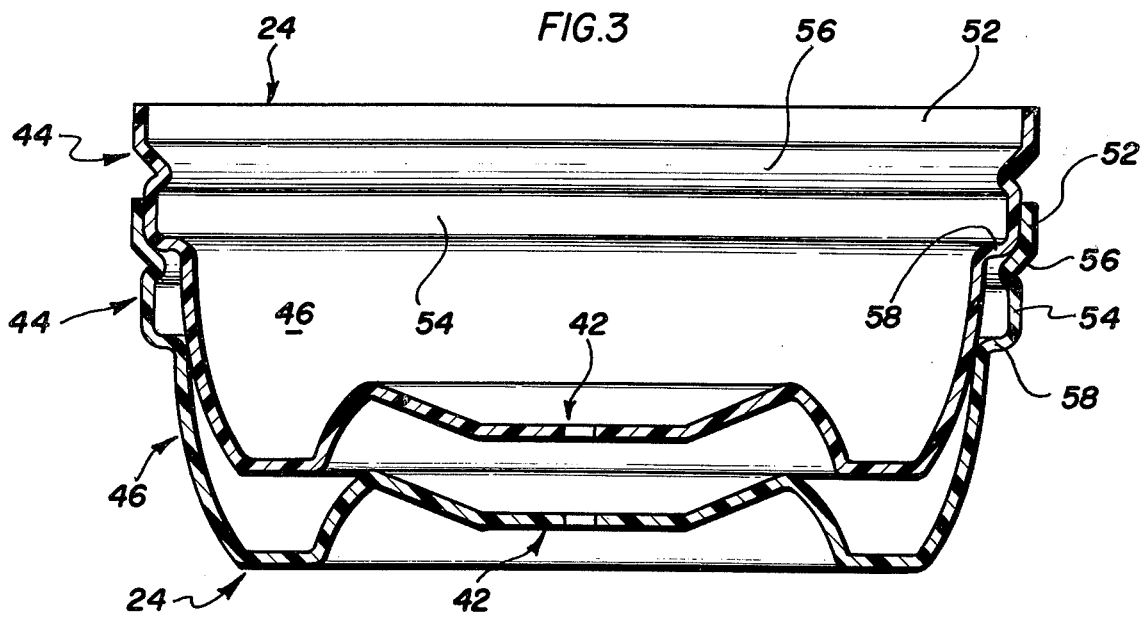

In order to conserve space in storage and shipping, it is desirable that the bases be nestable. Accordingly, the lower panel 54 of each base is of smaller diameter than the upper wall 52 by approximately double the wall thickness. Thus, the wall 54 of an upper base may fit within the upper wall 52 of a lower base in accordance with the showing of FIG. 3. Furthermore, the horizontal wall 58 of the upper base rests on the bead 56 of the lower base to establish a downstop.

In compliance with the features of the present invention, the base 24 provides stable placement for the round bottomed bottle 22 even under conditions of axial loading or upon the base experiencing permanent deformation or "set" after encountering abnormal conditions. Returning to FIG. 4, this stability of support is accomplished by fashioning the support channel 46 to include radially inner and outer annular channel wall portions 62 and 64 which are connected by an intermediate, annular foot portion 66. Furthermore, the inner channel wall portion 62 is arranged to have a lesser dimension axially of the base 24 than the outer channel wall portion 64. This relative radial positioning and axial dimensioning of the channel wall portions 62 and 64 cooperate in causing the inner channel wall portion 62 to deform preferentially, i.e. to a greater degree than the outer channel wall portion 64, under axial loading.

Under normal conditions wherein the base 24 bears only the weight of the bottle 22 and its contents, the foot portion 66 rests firmly in engagement with an underlying, flat, generally horizontal surface 68 as is shown in FIG. 4. However, when considerable axial loads are impressed upon the assembled bottle and base, as for example might be encountered when stacking cases of the filled container assemblies, both the inner and outer channel wall portions 62 and 64 bulge radially outwardly, as is suggested in FIG. 5, incurring hoop stresses.

The horizontal wall 58 of connecting ring 44 merges with the outer channel wall portions 64 at first annular stress transferrence member 70; and the inner channel wall portion 62 connects with the frusto-conical panel 50 of central bottom panel 42 at a second annular stress transferrence member 72. These annular stress transferrence members transmit axial loads through the material of bottle 22 to the channel wall portions 62 and 64 while clear space is provided between the transferrence members for freedom of response by the channel wall portions.

Even under extreme conditions of axial loading wherein the disc 48 engages the underlying surface 68, as is shown in FIG. 6, the inner and outer channel wall portions 62 and 64 continue to take sharply curved form in hoop stress condition. The annular foot portion 66 also persists in contact with the underlying surface 68 whereby to provide a stable, non-tilting support. This stability feature exists even when the axial load is removed and the base returns to its original condition, shown in FIG. 4, or when the support channel 46 undergoes partial restoration and experiences a degree of permanent deformation, as is suggested in FIG. 7.

The plastic bottle 22 may be fabricated to store a variety of pressurized contents such as beer and cola beverages, as well as a variety of foods, household and personal care aerosol products; and such techniques as blow molding and seamless injection blow molding can be employed. On the other hand, the base 24 may be made by a sheet forming process such as is disclosed in U.S. Pat. No. 3,465,071, particularly the scheme shown and described with reference to FIG. 8 of that patent.

While one embodiment of the present invention has been shown and described, it should be understood that many modifications may be made. Therefore, and in order to enhance the understanding of the invention, two modified forms are shown in FIG. 8 and FIGS. 9 and 10 respectively, like numerals having been employed to designate like parts with the suffix letter *a* being employed to distinguish those parts associated with the embodiment of FIG. 8 and the suffix letter *b* being employed with regard to the modification shown in FIGS. 9 and 10.

The base and bottle arrangement of FIG. 8 is characterized by the elimination of both the vertical wall 54 and the horizontal wall 58 of the connecting ring and the replacement of those elements by an annular curved ring 74 which merges with the outer wall of support channel 46*a* and which coincides with the shape of the adjacent wall of the bottle 22*a* in forming a continuation of the mutually engaging bead 56*a* and groove 36*a*. The latter arrangement enhances the attachment area for adhesive placement for example. The arrangement of FIG. 8 also includes a vent opening 76 fashioned in the disc 48*a* for facilitating air escape during assembly of the bottle and base.

The modification shown in FIGS. 9 and 10 is characterized by the replacement of the continuous coupling bead 56 by a plurality of annularly spaced, inwardly extending coupling members or discontinuous beads 78 for engagement with the bottle groove 36*b*. The discontinuities between the members 78 serve a venting function.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. A base made of thin wall and substantially uniform thickness material for round bottomed containers comprising: bottom panel means having a radially outwardly and upwardly directed shallow frusto-conical shape for substantially circular contact of the radially outward upper edge portion of said bottom panel means with the bottom of a round bottomed container, connecting ring means for coupling said base to a said container; and annular support channel means joining said bottom panel means to said connecting ring means, said annular support channel means comprising substantially radially spaced-apart inner and outer annular channel wall portions and an annular foot portion interconnecting the lower ends of said channel wall portions, said connecting ring means comprising an annular shoulder at the lower end thereof which extends radially inwardly and is integrally connected to the upper end of said outer annular channel wall portion, the radially outward upper edge of said bottom panel means integrally connected to the upper end of said inner annular channel wall portion, said inner channel wall portion having an upwardly converging frusto-conical and radially outwardly convex shape and having a substantially lesser dimension axially of said base than said outer channel wall portion, said outer annular channel wall portion having a radially outwardly continuously curvilinear convex shape and a height sufficient to engage the bottom of a round bottomed container in substantially circular line contact therewith radially outwardly and upwardly of said circular contact of said radially outward upper edge of said bottom panel means with said container, said annular foot portion comprising a substantially flat planar ring with the plane of said ring perpendicular to the axis of said base, coupling means integrally connected to the radially outward edge of said annular shoulder of said connecting ring means for coupling said base to a round bottomed container, whereby the relative radial positioning and axial dimensioning of said bottom panel means and said channel wall portions causes said inner channel wall portion to deform convexly outwardly to a greater degree than said outer channel wall portion under axial loading whereby to insure stable, vertical placement of an assembled base and a round bottomed container.

2. A base according to claim 1 wherein said coupling means includes a continuous annular member.

3. A base according to claim 1 wherein said coupling means includes a plurality of annularly spaced members.

4. A base according to claim 1 wherein said bottom panel means includes vent means.

5. A base according to claim 1 wherein said connecting ring means comprises upper and lower annular walls, said lower wall extending upwardly from the radially outward edge of said annular shoulder and being spaced radially inwardly of said upper wall whereby to accomodate nesting of a plurality of said bases.

6. A base and round bottomed container assembly comprising: a base including central bottom panel means having a radially outwardly and upwardly directed shallow frusto-conical shape for substantially circular contact of the radially outward upper edge portion of said bottom panel means with the bottom of said round bottomed container, connecting ring means for coupling said base to a said container, and annular support channel means joining said bottom panel means to said ring means, said annular support channel means comprising substantially radially spaced-apart inner and outer annular channel wall portions and an annular foot portion interconnecting the lower ends of said channel wall portions, said inner channel wall portion having an upwardly converging frusto-conical and radially outwardly convex shape and having a substantially lesser dimension axially of said base than said outer channel wall portion, said connecting ring means comprising an annular shoulder at the lower end thereof which extends radially inwardly and is integrally connected to the upper end of said outer annular channel wall portion, the radially outward upper edge of said bottom panel means integrally connected to the upper end of said inner annular channel wall portion, said outer channel wall portion having a radially outwardly continuously curvilinear convex shape and the upper end of said outer channel wall portion terminating in a circle of a diameter less than the diameter of said ring means and at a height to engage the bottom of said round bottomed container in substantially circular line contact therewith radially outwardly and upwardly of said circular contact of said radially outward upper edge of said bottom panel means with said container, said annular foot portion comprising a substantially flat planar ring with the plane of said ring perpendicular to the axis of said base, the relative radially positioning and axial dimensioning of said bottom panel means and said channel wall portions causing said inner channel wall portion to deform convexly outwardly to a greater degree than said outer channel wall portion under axial loading whereby to insure stable, vertical placement of the base and container assembly; and a round bottomed container including an upper pouring member, a lower round bottom member disposed within said base, said bottom member directly engaging the radially outward upper edge of said bottom panel means and the upper ends of said inner and outer channel wall portions to support said container directly on the radially outward upper edge of said bottom panel means and the upper ends of said inner and outer channel wall portions, and said container further including mounting means interengaging the connecting ring means above said annular shoulder of said base to hold said base on said container.

7. An assembly according to claim 6 wherein said bottom panel means includes vent means.

* * * * *